ACCESS UNIT FOR USE IN UNDERFLOOR DUCT SYSTEMS

Original Filed Jan. 28, 1955 2 Sheets-Sheet 1

INVENTORS
Glenn E. Blinn
Charles Flackbarth
BY Prince Edmonds
Merton Barrows & Taylor
ATTORNEYS

ACCESS UNIT FOR USE IN UNDERFLOOR DUCT SYSTEMS

Original Filed Jan. 28, 1955 2 Sheets-Sheet 2

INVENTORS
Glenn E. Blinn
Charles Hackbarth
BY Dennis Edmonds
Norton, Bennett & Taylor
ATTORNEYS United States Patent Office Re. 25,042
Patented Sept. 26, 1961

25,042

ACCESS UNIT FOR USE IN UNDERFLOOR DUCT SYSTEMS

Glenn E. Blinn, Teaneck, N.J., and Charles Flachbarth, deceased, late of Narberth, Pa., by Charles T. Flachbarth, executor, Springfield, Pa.; said Glenn E. Blinn and Charles Flachbarth assignors to Walker Brothers, Conshohocken, Pa., a corporation of Pennsylvania Original No. 2,824,578, dated Feb. 25, 1958, Ser. No. 484,784, Jan. 28, 1955. Application for reissue Feb. 3, 1959, Ser. No. 791,784
7 Claims. (Cl. 138—92)

Matter enclosed in heavy brackets [ ] appears in the original patent but forms no part of this reissue specification; matter printed in italics indicates the additions made by reissue.

This invention relates to duct systems for electrical wiring installed in the floors of buildings and is concerned more particularly with a novel access unit for use in such systems to provide access to the interior of the ducts. The new unit may be employed to particular advantage in underfloor duct systems, in which selected cells of a multicellular steel floor provide wiring raceways, and a form of the new unit for use in such systems will, accordingly, be illustrated and described in detail for purposes of explanation.

In underfloor duct systems, in which cells of a multicellular floor are employed as wiring raceways running in one direction, the circuit wiring is brought to such raceways from wall cabinets or boxes through header ducts, which lie upon and extend across the cells. The header ducts are provided with access openings at selected points and frequently the openings are uniformly spaced by a distance equal to a whole multiple of the distance between the centers of adjacent ducts. An access unit is employed to close each opening in the header duct and the unit extends upward through the concrete forming the floor and its top lies flush with the floor surface. It is desirable that such an access unit be adjustable in height, and it should be capable of easy installation, so that a unit may be placed in position whenever access to the system at a new location is necessary after completion of the system.

The access unit of the invention can be easily installed in an opening in the duct of an underfloor duct system, such as a header duct, and it is readily adjustable, so that it may be increased or decreased in height as required by variations in the thickness of the floor material above the duct, in which it is mounted. The unit is so constructed that, in the pouring of the concrete of the floor, no concrete can enter the unit and the duct, and adjustments in the height of the unit can be made either before or after the concrete has been poured, since the adjusting means lie wholly within the unit and thus out of contact with the concrete.

For a better understanding of the invention, reference may be made to accompany drawings, in which FIG. 1 is a view in perspective of a portion of a duct system of the invention;

Figure 1:
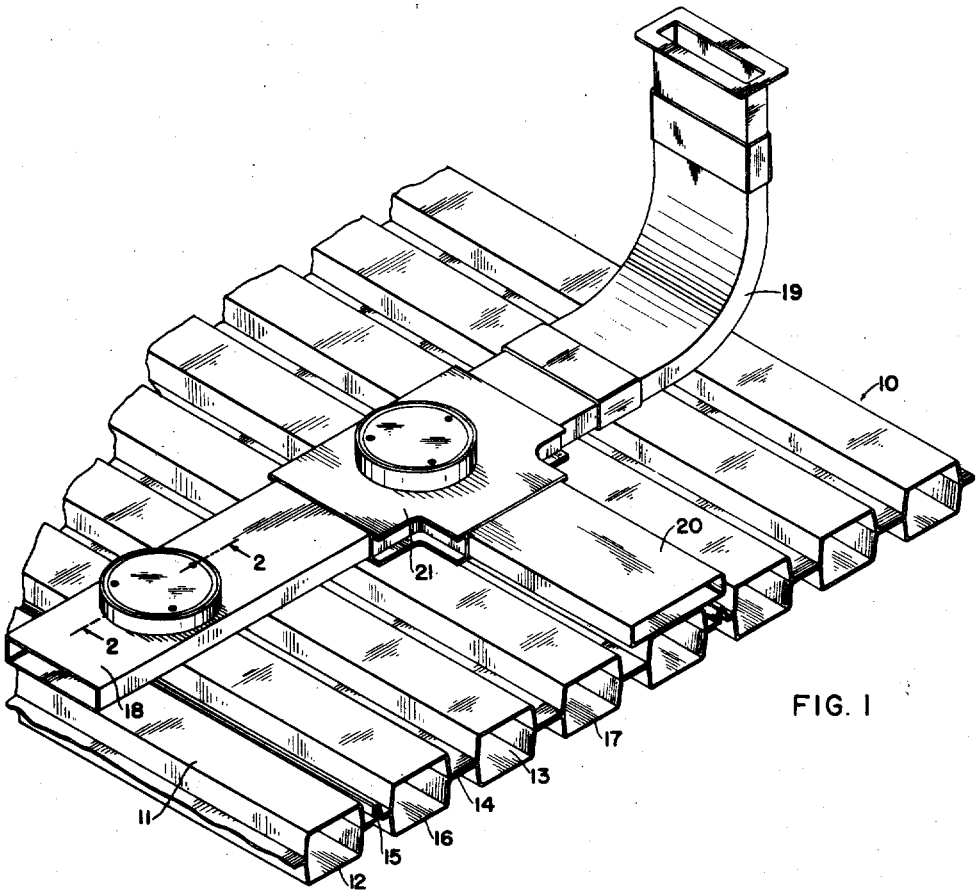

In the duct system shown in FIG. 1, cells of a multicellular floor generally designated 10 are used as circuit wiring raceways and the number and location of the cells employed for the purpose depends upon the use to be made of the floor area and the specific requirements of the occupants. Multicellular floors are commonly made of sections, each comprising an upper corrugated metal sheet 11 and a similar lower sheet 12 secured together in reversed relation as by welding to form a series of long cells 13, which serve as hollow beams and are connected by flanges 14. The sections of the floor are made in varying lengths according to the dimensions of the building frame structure and adjacent sections are provided with interlocking parts 15 for holding the sections in position relative to each other. In the erection of the building, the floor sections are placed with their ends supported on the beams of the frame structure and the sections are ordinarily disposed with their cells in alignment so as to form continuous raceways from one wall of the building to the opposite wall.

In the duct system illustrated, the cell 16 is used as a raceway and the circuit wiring is brought to the raceways through header ducts from the usual wall cabinets or boxes, where the wiring is connected to the feeder cables. One of the header ducts is shown at 18 and each header duct lies upon the top of the multicellular floor transversely of the cells and is secured to the floor in any desired way as by straps attached at their ends to flanges of the floor and extending over the top of the duct. At one or both ends, a header duct may have an elbow section 19 leading upward to a wall cabinet and, when it is desired to provide an extension 20 of a duct leading, for example, to a column, a section of the duct may be removed and replaced by a box 21 of T-shape having aligned openings for receiving the ends of the duct and a side opening receiving the end of the extension.

Each header duct is provided with top openings, through which access to the interior of the duct can be had, and such openings lie above cells of the floor. At the time of installation of the system, the bottom of each header duct may be connected to the cell beneath each access opening, although, in some systems, such connections may not all be made in advance of the completion of the floor. The number of access openings and their spacing along a header duct depends upon the number and spacing of the cells of the floor to be used as raceways. For some purposes, the header ducts are provided with access openings at 12″ spacings while, in other ducts, the spacing is 18″, 24″, etc. In all ducts having access openings at a uniform spacing, the spacing is a whole multiple of the distance between the axes of adjacent cells of the floor.

Floor structures, in which multicellular steel floors are employed, are completed at the top by concrete poured upon the steel floor to fill the spaces between the cells and form a layer providing the top floor surface. At each access opening, the header duct has an access unit, which serves as a closure for the opening and extends up through the concrete with its top lying flush with the floor surface. As the concrete layer may vary in thickness for various reasons, as, for example, because extra material was required to level the floor surface in an area where the steel floor sagged under the weight of the concrete, the access units are adjustable in height through a substantial range and such adjustment can be readily made before or after the concrete has set.

Each access unit of the invention comprises a sleeve 23 which has a section 23a lying within the access opening in the top of the duct. When the access unit is installed at the factory, the section 23a of the sleeve used is longer than the thickness of the duct wall and the end of the section projecting into the duct is forced outwardly to provide a section 23b engaging the inner surface of the duct around the opening. Above section 23a, the sleeve has a section 23c extending radially from the opening and lying in contact with the upper surface of the duct and a cylindrical section 23d extends upward from the outer edge of the radial section 23c. When the sleeve is mounted as described, it provides a smooth surface within the access opening.

A ring 24 is supported adjustably within the cylindrical section 23d of each sleeve 23 and, for this purpose, three screws 25 are mounted to extend through openings in the section 23c of the sleeve and enter internally threaded openings through internal bosses 24a on the ring 24. Each screw has a flared head at its lower end, which lies in contact with the top wall of the duct 18. Thus the screws 25 have a fixed axial position and are captive in that they are retained by the member in which they are mounted for free, non-threaded rotation. The upper end of the screws are slotted to receive a screw driver inserted through the upper end of the openings receiving the screws.

Near its top, the ring is provided with an internal flange 26 for supporting a cover plate 27, which rests on a gasket 28 on the flange and is held in place by screws 29 passed through openings in the plate and threaded into *bosses 29a extending inwardly from* flange 26. In installations, in which the cover plate and the top of ring 24 lie flush with the floor surface indicated at 30 and the floor surface is bare, the tops of screws 29 lie in the level of the top of the cover plate 27. In installations, in which a layer 31 of linoleum or like floor covering material is placed upon the top of the floor, a metal dish 32 having a depth equal to the thickness of layer 31 and a flat bottom may be used with the cover plate. A disc 33 of the floor covering material fills the dish and the screws 29 then pass through bushings 34 in the disc and through the disc and cover plate and gasket into flange 26.

Beneath each access opening, the header duct and the raceway cells are connected through aligned openings. As the wiring is drawn through the ducts and into the cells about the edges of these openings, it is desirable to provide smooth internal surfaces for the openings. For this purpose, a split grommet 35 of residient metal is collapsed to pass through each pair of aligned openings in the walls of the duct and cell and is then released so that, upon expansion, its flanges 35a, 35b will project radially from the openings and lie within the duct and cell.

Figure 2:
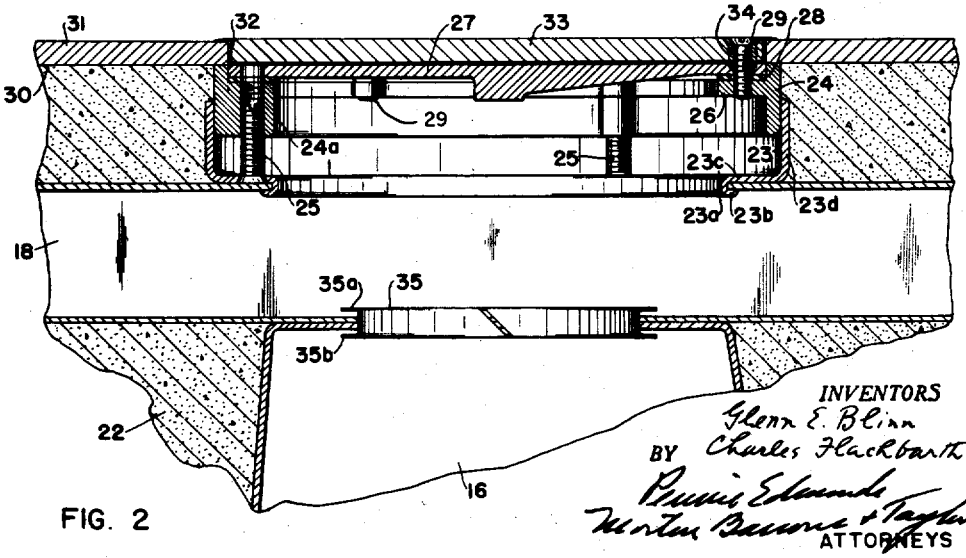
FIG. 2 is a vertical sectional view on the line 2—2 of FIG. 1.
Figure 3:
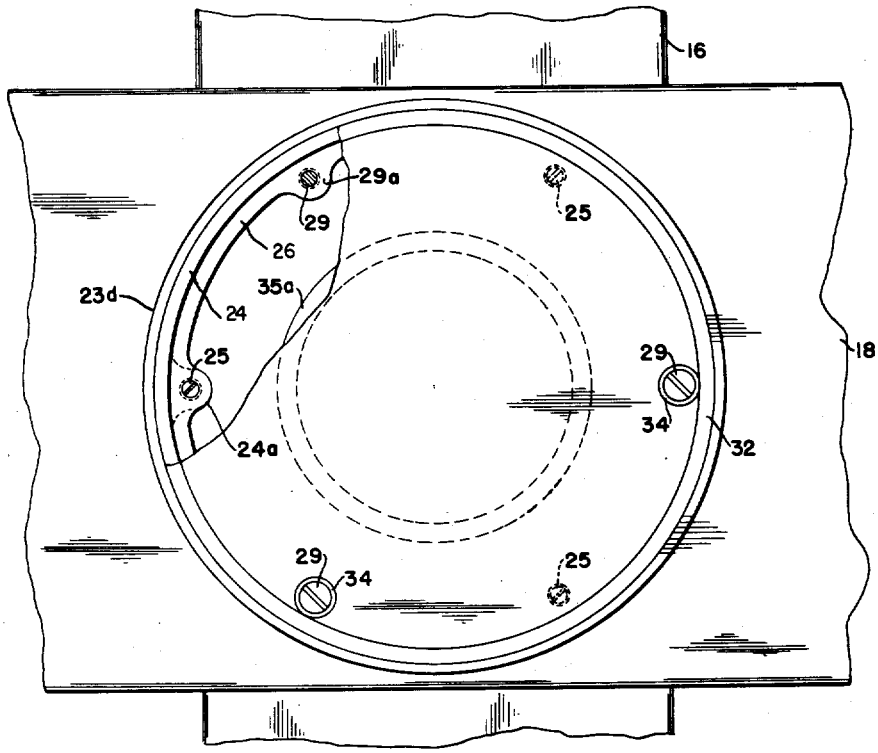
FIG. 3 is a top plan view of one of the access units of the header duct.
Figure 4:
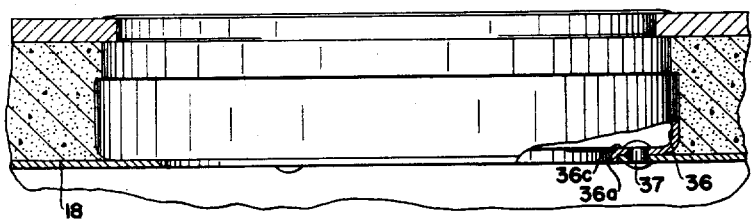
FIG. 4 is a view of the access unit in side elevation with parts broken away.

In some installations of duct systems, it may be necessary to enlarge the system by utilizing as raceways cells of the floor, which do not lie beneath access openings of the header ducts. When such a need arises, a hole is made in the floor to expose a portion of the duct above the cell, to which the conection is to be made, and an access opening is then cut through the top wall of the duct and aligned openings are similarly cut through the bottom wall of the duct and the top wall of the cell by a suitable tool. A modified form of the new access unit is installed in the top opening and the unit used is the same in all respects as the unit illustrated in FIG. 2 except that its sleeve 36 has a section 36a, which extends through the opening in the top of the duct but has no section extending radially within the duct from the opening and corresponding to section 23b. The sleeve 36 has a radial section 36a resting on the top of the duct and corresponding to section 23c and, in order to secure the unit in place in the opening in the duct, openings are drilled through section 36a of the sleeve and the wall of the duct and self-locking rivets 37 are inserted in the openings to lock the sleeve in place.

In underfloor duct systems of the type described, the number of and location of the cells of the multicellular floor used as circuit wiring raceways and the number of and location of the header ducts will depend on the use to which the floor space is to be put. The number of and location of the access openings in the ducts will be determined by the number and location of the cells serving as parts of the system. In the installation of the system, the multicellular floor is laid in the usual way and the header ducts with the access units in place are placed upon the floor and secured in position as described. The floor is then completed by the pouring of the concrete and, during this operation, the concrete cannot enter the access units, since the ring 24 of each unit telescopes snugly within sleeve 23 or 26. After the concrete has been poured, the cover plates are removed from the access units lying above the cells which are to be used as raceways, and the connections between the ducts and the cells are cut and the grommets inserted. The cover plates may then be returned to position and, when necessary, the rings 24 of the access units are adjusted by screws 25 to bring the tops of the units flush with the floor surface. This adjustment of the height of the units is simple, since the screws 25 lie within the units and are thus out of contact with the concrete.

We claim:

1. A header duct for use with a multicellular floor which comprises flat top and bottom walls, side walls connecting the top and bottom walls, the top wall having at least one opening, a sleeve mounted in the opening and extending upward, a closure for the sleeve mounted within it and movable vertically, and means within the sleeve and operable through the top of the closure for adjusting the position of the closure lengthwise of the sleeve.

2. The header duct of claim 1, in which the sleeve has a bottom section lying within the opening, a radial section connected to the upper end of the bottom section and overlying the duct top wall around the opening, and a top section extending upward from the outer edge of the radial section, the closure comprises a ring and a cover plate having aligned openings, the openings through the ring being threaded, and the adjustment means are screws extending through openings through the radial section of the sleeve and into the threaded openings through the ring, the tops of the screws being slotted and being accessible through the openings through the cover plate for rotation to vary the vertical position of the closure in the sleeve.

3. An access unit for closing an opening in a duct of an underfloor duct system, which comprises a sleeve adapted to be secured to the top of the duct to surround the opening and having a radial, inwardly-extending section and a top section extending upwardly from the outer portion of the radial section, a ring disposed telescopically within the top section of the sleeve, a plurality of adjustment screws mounted within the sleeve in both the radial section of the sleeve and the ring and lying parallel to the axis of the sleeve, the screws being rotatable to cause the ring to move vertically upwardly and downwardly relative to the sleeve, whereby rotation of the screws will cause relative vertical adjustment of the ring relative to the sleeve, said adjustment screws having the same axial position when being rotated to move the ring upwardly as when they are rotated to move the ring downwardly, and a cover plate attached to the ring to close the upper end thereof.

4. The access unit of claim 3, in which the adjustment means are screws extending into threaded vertical openings through the ring and having slotted upper ends, *the cover plate has openings in axial alignment with the adjustment screws, and the slotted upper ends of the adjustment screws are* accessible through the openings in the cover plate.

5. The access unit of claim 4, in which the radial section of the sleeve has openings, through which the screws extend upward to enter the openings through the ring.

6. The access unit of claim 3, in which the ring has an internal radial flange, the cover plate is seated on the flange, and screws passing through the cover plate and into the flange hold the cover plate in position.

7. The access unit of claim 3, in which the adjustment screws are captive.

References Cited in the file of this patent or the original patent

UNITED STATES PATENTS

| | | |
|---|---|---|
| 740,663 | Krantz | Oct. 6, 1903 |
| 1,533,759 | Richardson et al. | Apr. 14, 1925 |
| 1,809,613 | Walker | June 9, 1931 |
| 1,925,849 | Sharp | Sept. 5, 1933 |
| 1,949,883 | Sharp | Mar. 6, 1934 |
| 2,043,648 | Bissell et al. | June 9, 1936 |
| 2,063,569 | Walker | Dec. 8, 1936 |
| 2,445,197 | Wiesman | July 13, 1948 |
| 2,657,250 | Wiesman | Oct. 27, 1953 |
| 2,672,749 | Wiesman | Mar. 23, 1954 |
| 2,763,294 | Kennedy | Sept. 18, 1956 |

FOREIGN PATENTS

| | | |
|---|---|---|
| 471,845 | Canada | Mar. 6, 1951 |